United States Patent
Affinito et al.

(10) Patent No.: US 6,544,600 B2
(45) Date of Patent: *Apr. 8, 2003

(54) PLASMA ENHANCED CHEMICAL DEPOSITION OF CONJUGATED POLYMER

(75) Inventors: John D. Affinito, Tucson, AZ (US); Gordon L. Graff, West Richland, WA (US); Mark E. Gross, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/811,871

(22) Filed: Mar. 19, 2001

(65) Prior Publication Data

US 2002/0071911 A1 Jun. 13, 2002

Related U.S. Application Data

(63) Continuation-in-part of application No. 09/212,781, filed on Dec. 16, 1998, now Pat. No. 6,207,239.

(51) Int. Cl.[7] ............................................. C23C 16/505
(52) U.S. Cl. .................. 427/488; 427/497; 427/506; 427/507; 427/509; 427/520; 427/255.6
(58) Field of Search .................. 427/488, 497, 427/506, 507, 509, 520, 562, 569, 255.6

(56) References Cited

U.S. PATENT DOCUMENTS

| | | | |
|---|---|---|---|
| 3,475,307 A | * | 10/1969 | Knox et al. ............... 204/165 |
| 3,607,365 A | | 9/1971 | Lindlof |
| 4,098,965 A | | 7/1978 | Kinsman |
| 4,283,482 A | * | 8/1981 | Hattori et al. ............. 216/62 |
| 4,581,337 A | | 4/1986 | Frey et al. |
| 4,624,867 A | | 11/1986 | Iijima et al. |
| 4,695,618 A | | 9/1987 | Mowrer |
| 4,842,893 A | | 6/1989 | Yializis et al. |
| 4,954,371 A | * | 9/1990 | Yializis ..................... 392/399 |
| 5,032,461 A | | 7/1991 | Shaw et al. |
| 5,204,314 A | | 4/1993 | Kirlin et al. |
| 5,237,439 A | | 8/1993 | Misono et al. |
| 5,260,095 A | | 11/1993 | Affinito |

(List continued on next page.)

FOREIGN PATENT DOCUMENTS

| | | |
|---|---|---|
| BE | 704 297 | 2/1968 |
| DE | 19603746 | 4/1997 |
| EP | 0 299 753 | 1/1989 |
| EP | 0 340 935 | 11/1989 |
| EP | 0 390 540 | 10/1990 |

(List continued on next page.)

OTHER PUBLICATIONS

Affinito, J.D., et al., "Vacuum Deposition of Polymer Electrolytes on Flexible Substrates," "Proceedings of the Ninth International Conference on Vacuum Web Coating," Nov. 1995 ed R. Bakish, Bakish Press 1995, p. 20–36.

Vossen, J.L., et al., Thin Film Processes, Academic Press, 1978, Part II, Chapter 11–1, Glow Discharge Sputter Deposition, p. 12–63; Part IV, Chapter IV–1, Plasma Deposition of Inorganic Compounds and Chapter IV–2 Glow Discharge Polymerization, p. 335–397.

(List continued on next page.)

Primary Examiner—Timothy Meeks
(74) Attorney, Agent, or Firm—Killworth, Gottman, Hagan & Schaeff, L.L.P.

(57) ABSTRACT

A method for making conjugated polymers. The method includes flash evaporating a conjugated material forming an evaporate, passing the evaporate to a glow discharge electrode creating a glow discharge conjugated material plasma from the evaporate, and cryocondensing the glow discharge conjugated polymer precursor plasma on a substrate as a condensate and crosslinking the condensate thereon, the crosslinking resulting from radicals created in the glow discharge conjugated material plasma.

28 Claims, 3 Drawing Sheets

U.S. PATENT DOCUMENTS

| | | | |
|---|---|---|---|
| 5,354,497 A | 10/1994 | Fukuchi et al. | |
| 5,395,644 A | 3/1995 | Affinito | |
| 5,427,638 A | 6/1995 | Goetz et al. | |
| 5,440,446 A | 8/1995 | Shaw et al. | |
| 5,536,323 A | 7/1996 | Kirlin et al. | |
| 5,547,508 A | 8/1996 | Affinito | |
| 5,554,220 A | 9/1996 | Forrest et al. | |
| 5,576,101 A | 11/1996 | Saitoh et al. | |
| 5,607,789 A | 3/1997 | Treger et al. | |
| 5,620,524 A | 4/1997 | Fan et al. | |
| 5,629,389 A | 5/1997 | Roitman et al. | |
| 5,652,192 A | 7/1997 | Matson et al. | |
| 5,654,084 A | 8/1997 | Egert | |
| 5,665,280 A | 9/1997 | Tropsha | |
| 5,681,615 A * | 10/1997 | Affinito et al. | 427/255.6 |
| 5,681,666 A | 10/1997 | Treger et al. | |
| 5,684,084 A | 11/1997 | Lewin et al. | |
| 5,686,360 A | 11/1997 | Harvey, III et al. | |
| 5,693,956 A | 12/1997 | Shi et al. | |
| 5,711,816 A | 1/1998 | Kirlin et al. | |
| 5,725,909 A | 3/1998 | Shaw et al. | |
| 5,731,661 A | 3/1998 | So et al. | |
| 5,747,182 A | 5/1998 | Friend et al. | |
| 5,757,126 A | 5/1998 | Harvey, III et al. | |
| 5,759,329 A | 6/1998 | Krause et al. | |
| 5,792,550 A | 8/1998 | Phillips et al. | |
| 5,811,177 A | 9/1998 | Shi et al. | |
| 5,811,183 A | 9/1998 | Shaw et al. | |
| 5,821,692 A | 10/1998 | Rogers et al. | |
| 5,844,363 A | 12/1998 | Gu et al. | |
| 5,872,355 A | 2/1999 | Hueschen | |
| 5,902,641 A * | 5/1999 | Affinito et al. | 427/255.32 |
| 5,902,688 A | 5/1999 | Antoniadis et al. | |
| 5,904,958 A | 5/1999 | Dick et al. | |
| 5,912,069 A | 6/1999 | Yializis et al. | |
| 5,919,328 A | 7/1999 | Tropsha et al. | |
| 5,922,161 A | 7/1999 | Wu et al. | |
| 5,945,174 A | 8/1999 | Shaw et al. | |
| 5,948,552 A | 9/1999 | Antoniadis et al. | |
| 5,955,161 A | 9/1999 | Tropsha | |
| 5,965,907 A | 10/1999 | Huang et al. | |
| 5,968,620 A | 10/1999 | Harvey et al. | |
| 5,996,498 A | 12/1999 | Lewis | |
| 6,013,337 A | 1/2000 | Knors | |
| 6,045,864 A | 4/2000 | Lyons et al. | |
| 6,083,628 A | 7/2000 | Yializis | |
| 6,092,269 A | 7/2000 | Yializis et al. | |
| 6,106,627 A | 8/2000 | Yializis | |
| 6,146,225 A | 11/2000 | Sheats et al. | |
| 6,165,566 A | 12/2000 | Tropsha | |
| 6,207,239 B1 * | 3/2001 | Affinito | 427/255.6 |
| 6,214,422 B1 | 4/2001 | Yializis | |
| 6,224,948 B1 * | 5/2001 | Affinito | 427/255.6 |
| 6,231,939 B1 | 5/2001 | Shaw et al. | |

FOREIGN PATENT DOCUMENTS

| | | |
|---|---|---|
| EP | 0 547 550 | 6/1993 |
| EP | 0 590 467 | 4/1994 |
| EP | 0 722 787 | 7/1996 |
| EP | 0 787 826 | 8/1997 |
| EP | 0 916 394 | 5/1999 |
| EP | 0 931 850 | 7/1999 |
| EP | 0 977 469 | 2/2000 |
| JP | 6316316 | 6/1988 |
| JP | 64-18441 | 1/1989 |
| JP | 2-183230 | 7/1990 |
| JP | 08325713 | 12/1996 |
| JP | 09059763 | 3/1997 |
| WO | WO 87 07848 | 12/1987 |
| WO | WO 95 10117 | 4/1995 |
| WO | WO 97 04885 | 2/1997 |
| WO | WO 97 22631 | 6/1997 |
| WO | WO 98 10116 | 3/1998 |
| WO | WO 98 18852 | 5/1998 |
| WO | WO 99 16557 | 4/1999 |
| WO | WO 99 16931 | 4/1999 |

OTHER PUBLICATIONS

Penning, F.M., Electrical Discharges in Gasses, Gordon and Breach Science Publishers, 1965, Chapters 5–6, p. 19–35, and Chapter 8, p. 41–50.

Affinito, J.D., et al, "High Rate Vacuum Deposition of Polymer Electrolytes," Journal Vacuum Science Technology A 14(3), May/Jun. 1996.

Inoue et al., Fabrication of a Thin Film of MNA by Vapour Deposition, Proc. Jpn. Congr. Mater. Res., vol. 33, p. 177–9, 1990.

Affinito, J.D. et al., "PML/Oxide/PML Barrier Layer Performance Differences Arising From Use of UV or Electron Beam Polymerization of the PML Layers," Thin Solid Films, Elsevier Science S.A., vol. 308–309, Oct. 31, 1997, pp. 19–25.

Gustafsson, G. et al, "Flexible light–emitting diodes made from soluble conducting polymers," Nature, vol. 357, Jun. 11, 1992, pp. 447–479.

Affinito, J.D. et al., "Polymer–Oxide Transparent Barrier Layers," SVC 39th Annual Technical Conference, Vacuum Web Coating Session, 1996, pp. 392–397.

Affinito, J.D. et al, "PML/Oxide/PML Barrier Layer Performance Differences Arising From Use of UV or Electron Beam Polymerization of the PML Layers," SVC 40th Annual Technical Conference, 1997, pp. 19–25.

Wong, C.P., "Recent Advances in IC Passivation and Encapsulation: Process Techniques and Materials," Polymers for Electronic and Photonic Applications, AT&T Bell Laboratories, 1993, pp. 167–209.

De Gryse, R. et al., Sputtered Transparent Barrier Layers, pp. 190–198 (no date available).

Tropsha et al., "Activated Rate Theory Treatment of Oxygen and Water Transport through Silicon Oxide/Poly(ethylene terephthalate) Composite Barrier Structures," J. Phys. Chem B 1997, pp. 2259–2266.

Tropsha et al., "Combinatorial Barrier Effect of the Multilayer $SiO_x$ Coatings on Polymer Substrates," 1997 Society of Vacuum Coaters, 40th Annual Technical Conference Proceedings.

Phillips et al., "Evaporated Dielectric Colorless Films on PET and OPP Exhibiting High Barriers Toward Moisture and Oxygen," Society of Vacuum Coaters, 36th Annual Technical Conference Proceedings (1993), pp. 293–300.

Chahroudi, "Transparent Glass Barrier Coatings for Flexible Film Packaging," Society of Vacuum Coaters, 34th Annual Technical Conference Proceedings (1991), pp. 130–133.

Yamada et al., "The Properties of a New Transparent and Colorless Barrier Film," Society of Vacuum Coaters, 38th Annual Technical Conference Proceedings (1995), pp. 28–31.

Shi, M.K., et al., Plasma treatment of PET and acrylic coating surfaces–I. In situ XPS measurements, Journal of Adhesion Science and Technology, Mar. 2000, 14(12), pp. 1–28.

Shi, M.K., et al., In situ and real–time monitoring of plasma–induced etching PET and acrylic films, Plasmas and Polymers, Dec. 1999, 4(4), pp. 1–25.

Affinito, J.D., et al., Vacuum Deposited Conductive Polymer Films, The Eleventh International Conference on Vacuum Web Coating, no earlier than Feb. 1998, pp. 200–213.

Mahon, J.K., et al., Requirements of Flexible Substrates for Organic Light Emitting Devices in Flat Panel Display Applications, Society of Vacuum Coaters, 42nd Annual Technical Conference Proceedings, 1999, pp. 456–459.

Affinito, J.D. et al., "Molecularly Doped Polymer Composite Films for Light Emitting Polymer Applications Fabricated by the PML Process" 1998 Society of Vaccum Coaters, 41st Annual Technical Conference Proceedings (1998), pp. 220–225.

* cited by examiner

PLASMA ENHANCED CHEMICAL DEPOSITION OF CONJUGATED POLYMER

This application is a continuation-in-part of application Ser. No. 09/212,781, filed Dec. 16, 1998, entitled "Plasma Enhanced Chemical Deposition of Conjugated Polymer," now U.S. Pat. No. 6,207,239 B1.

FIELD OF THE INVENTION

The present invention relates generally to a method of making plasma polymerized conjugated polymer films. More specifically, the present invention relates to making a plasma polymerized conjugated polymer film via plasma enhanced chemical deposition with a flash evaporated feed source of a low vapor pressure compound.

As used herein, the term "(meth)acrylic" is defined as "acrylic or methacrylic." Also, (meth)acrylate is defined as "acrylate or methacrylate."

As used herein, the term "cryocondense" and forms thereof refer to the physical phenomenon of a phase change from a gas phase to a liquid phase upon the gas contacting a surface having a temperature lower than a dew point of the gas.

As used herein, the term "conjugated" refers to a chemical structure of alternating single and double bonds between carbon atoms in a carbon atom chain.

As used herein, the term "polymer precursor" includes monomers, oligomers, and resins, and combinations thereof. As used herein, the term "monomer" is defined as a molecule of simple structure and low molecular weight that is capable of combining with a number of like or unlike molecules to form a polymer. Examples include, but are not limited to, simple acrylate molecules, for example, hexanedioldiacrylate, or tetraethyleneglycoldiacrylate, styrene, methyl styrene, and combinations thereof. The molecular weight of monomers is generally less than 1000, while for fluorinated monomers, it is generally less than 2000. Substructures such as $CH_3$, t-butyl, and CN can also be included. Monomers may be combined to form oligomers and resins, but do not combine to form other monomers.

As used herein, the term "oligomer" is defined as a compound molecule of at least two monomers that can be cured by radiation, such as ultraviolet, electron beam, or x-ray, glow discharge ionization, and spontaneous thermally induced curing. Oligomers include low molecular weight resins. Low molecular weight is defined herein as about 1000 to about 20,000 exclusive of fluorinated monomers. Oligomers are usually liquid or easily liquifiable. Oligomers do not combine to form monomers.

As used herein, the term "resin" is defined as a compound having a higher molecular weight (generally greater than 20,000) which is generally solid with no definite melting point. Examples include, but are not limited to, polystyrene resin, epoxy polyamine resin, phenolic resin, and acrylic resin (for example, polymethylmethacrylate), and combinations thereof.

BACKGROUND OF THE INVENTION

The basic process of plasma enhanced chemical vapor deposition (PECVD) is described in THIN FILM PROCESSES, J. L. Vossen, W. Kern, editors, Academic Press, 1978, Part IV, Chapter IV-1 Plasma Deposition of Inorganic Compounds, Chapter IV-2 Glow Discharge Polymerization, herein incorporated by reference. Briefly, a glow discharge plasma is generated on an electrode that may be smooth or have pointed projections. Traditionally, a gas inlet introduces high vapor pressure monomeric gases into the plasma region wherein radicals are formed so that upon subsequent collisions with the substrate, some of the radicals in the monomers chemically bond or cross link (cure) on the substrate. The high vapor pressure monomeric gases include gases of $CH_4$, $SiH_4$, $C_2H_6$, $C_2H_2$, or gases generated from high vapor pressure liquid, for example styrene (10 torr at 87.4° F. (30.8° C.)), hexane (100 torr at 60.4° F. (15.8° C.)), tetramethyldisiloxane (10 torr at 82.9° F. (28.3° C.)), 1,3-dichlorotetra-methyldisiloxane (75 torr at 44.6° F. (7.0° C.)), and combinations thereof that may be evaporated with mild controlled heating. Because these high vapor pressure monomeric gases do not readily cryocondense at ambient or elevated temperatures, deposition rates are low (a few tenths of micrometer/mm maximum) relying on radicals chemically bonding to the surface of interest instead of cryocondensation. Remission due to etching of the surface of interest by the plasma competes with the reactive deposition. Lower vapor pressure species have not been used in PECVD because heating the higher molecular weight monomers to a temperature sufficient to vaporize them generally causes a reaction prior to vaporization, or metering of the gas becomes difficult to control, either of which is inoperative.

The basic process of flash evaporation is described in U.S. Pat. No. 4,954,371 herein incorporated by reference. This basic process may also be referred to as polymer multi-layer (PML) flash evaporation. Briefly, a radiation polymerizable and/or cross linkable material is supplied at a temperature below a decomposition temperature and polymerization temperature of the material. The material is atomized to droplets having a droplet size ranging from about 1 to about 50 microns. An ultrasonic atomizer is generally used. The droplets are then flash vaporized, under vacuum, by contact with a heated surface above the boiling point of the material, but below the temperature which would cause pyrolysis. The vapor is cryocondensed on a substrate then radiation polymerized or cross linked as a very thin polymer layer.

The material may include a base monomer or mixture thereof, cross-linking agents and/or initiating agents. A disadvantage of the flash evaporation is that it requires two sequential steps, cryocondensation followed by curing or cross linking, that are both spatially and temporally separate.

According to the state of the art of making plasma polymerized films, PECVD and flash evaporation or glow discharge plasma deposition and flash evaporation have not been used in combination. However, plasma treatment of a substrate using glow discharge plasma generator with inorganic compounds has been used in combination with flash evaporation under a low pressure (vacuum) atmosphere as reported in J. D. Affinito, M. E. Gross, C. A. Coronado and P. M. Martin, "Vacuum Deposition Of Polymer Electrolytes On Flexible Substrates," Proceedings of the Ninth International Conference on Vacuum Web Coating, November 1995, ed. R. Bakish, Bakish Press 1995, pg. 20–36, and as shown in FIG. 1a. In that system, the plasma generator 100 is used to etch the surface 102 of a moving substrate 104 in preparation to receive the monomeric gaseous output from the flash evaporation 106 that cryocondenses on the etched surface 102 and is then passed by a first curing station (not shown), for example electron beam or ultra-violet radiation, to initiate cross linking and curing. The plasma generator 100 has a housing 108 with a gas inlet 110. The gas may be oxygen, nitrogen, water or an inert gas, for example argon, or combinations thereof. Internally, an electrode 112 that is smooth or having one or more pointed projections 114 produces a glow discharge and makes a plasma with the gas which etches the surface 102. The flash evaporator 106 has a housing 116, with a monomer inlet 118 and an atomizing nozzle 120, for example an ultrasonic atomizer. Flow through the nozzle 120 is atomized into particles or droplets 122 which strike the heated surface 124 whereupon the particles or droplets 122 are flash evaporated into a gas that flows past a series of baffles 126 (optional) to an outlet 128 and cryocondenses on the surface 102. Although other gas flow distribution arrangements have been used, it has been found that the baffles 126 provide adequate gas flow distribution or uniformity while permitting ease of scaling up to large surfaces 102. A curing station (not shown) is located downstream of the flash evaporator 106.

In the flash evaporation process using (meth)acrylate, the starting monomer is a (meth)acrylate monomer (FIG. 1b). When $R_1$ is hydrogen (H), the compound is an acrylate and when $R_1$ is a methyl group ($CH_3$), the compound is a methacrylate. If the group $R_2$ pendant to the (meth)acrylate group is fully conjugated, the O—C— linkage interrupts the conjugation and renders the monomer non-conducting. Exposure to electron beam radiation, or UV in the presence of a photoinitator, initiates polymerization of the monomer by creating free radicals at the (C=C) double bond in the (meth)acrylate linkage. After polymerization, the two (meth) acrylate double (C=C) bonds, where the cross-linking occurred, have been converted to single (C—C) bonds.

Thus, the cross-linking step further interrupts the conjugation and makes conductivity impossible.

Therefore, there is a need for a method for making plasma polymerized conjugated polymer layers at a fast rate but that is also self curing, preserving the conjugation.

SUMMARY OF THE INVENTION

The present invention is an improved method of plasma polymerization wherein a conjugated polymer precursor is cured during plasma polymerization.

The present invention may be viewed as a method for plasma enhanced chemical vapor deposition of conjugated low vapor pressure polymer precursor or a mixture of polymer precursor with particle materials onto a substrate, and as a method for making self-curing conjugated or conductive polymer layers, especially self-curing PML polymer layers. As used herein, the term "conjugated polymer" or "fully conjugated polymers" is defined as a polymer having sufficient degree of conjugation to be electrically conductive when doped. Thus, either the polymer precursor is fully conjugated or the particles either combine together or crosslink with the polymer precursor in a manner to provide a "fully conjugated polymer".

From both points of view, the invention is a combination of flash evaporation with plasma enhanced chemical vapor deposition (PECVD) that provides the unexpected improvements of permitting use of low vapor pressure polymer precursor conjugated materials in a PECVD process and provides a self curing from a flash evaporation process, at a rate surprisingly faster than standard PECVD deposition rates.

The method of the present invention includes flash evaporating a conjugated material forming an evaporate, passing the evaporate to a glow discharge electrode creating a glow discharge conjugated material plasma from the evaporate, and cryocondensing the glow discharge conjugated material plasma on a substrate as a condensate and crosslinking the condensate thereon, the crosslinking resulting from radicals created in the glow discharge plasma.

Accordingly, the present invention provides a method of making a conjugated or conductive polymer.

DETAILED DESCRIPTION OF THE INVENTION

Figure 2:
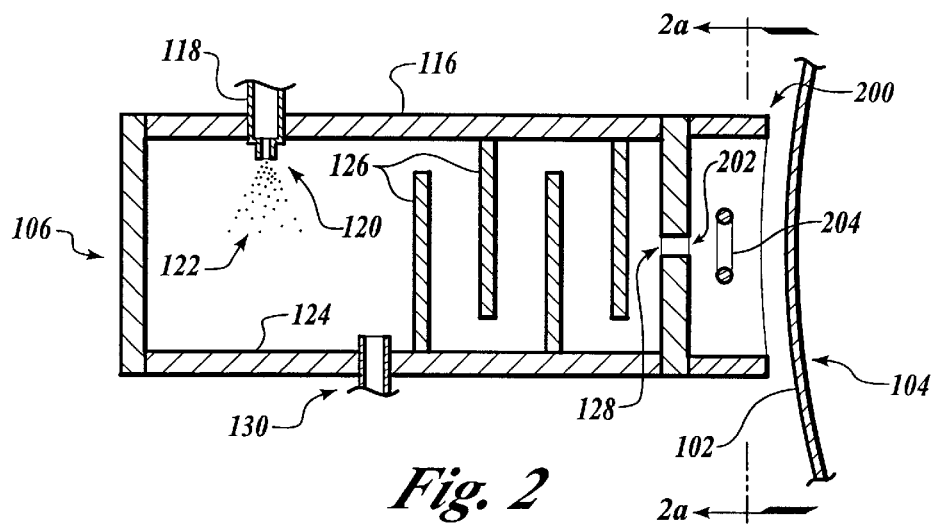
FIG. 2 is a cross section of an apparatus which can be used in the method of the present invention of combined flash evaporation and glow discharge plasma deposition.

An apparatus which can be used in the present invention is shown in FIG. 2. The method of the present invention may be performed within a low pressure (vacuum) environment or chamber. Pressures typically range from about $10^{-1}$ torr to $10^{-6}$ torr, although lower or higher pressures can be used. The flash evaporator 106 has a housing 116, with a polymer precursor inlet 118 and an atomizing nozzle 120. Flow through the nozzle 120 is atomized into particles or droplets 122 which strike the heated surface 124 whereupon the particles or droplets 122 are flash evaporated into a gas or evaporate that flows past a series of baffles 126 to an evaporate outlet 128 and cryocondenses on the surface 102. Cryocondensation on the baffles 126 and other internal surfaces is prevented by heating the baffles 126 and other surfaces to a temperature in excess of a cryocondensation temperature or dew point of the evaporate. Although other gas flow distribution arrangements have been used, it has been found that the baffles 126 provide adequate gas flow distribution or uniformity while permitting case of scaling up to large surfaces 102. The evaporate outlet 128 directs gas toward a glow discharge electrode 204 creating a glow discharge plasma from the evaporate. In the embodiment shown in FIG. 2, the glow discharge electrode 204 is placed in a glow discharge housing 200 having an evaporate inlet 202 proximate the evaporate outlet 128. In this embodiment, the glow discharge housing 200 and the glow discharge electrode 204 are maintained at a temperature above a dew point of the evaporate. The glow discharge plasma exits the glow discharge housing 200 and cryocondenses on the surface 102 of the substrate 104. The substrate 104 is typically kept at a temperature below a dew point of the evaporate, generally ambient temperature or cooled below ambient temperature to enhance the cryocondensation rate. In this embodiment, the substrate 104 is moving and may be electrically grounded, electrically floating, or electrically biased with an impressed voltage to draw charged species from the glow discharge plasma. If the substrate 104 is electrically biased, it may even replace the electrode 204 and be, itself, the electrode which creates the glow discharge plasma from the polymer precursor gas. Electrically floating means that there is no impressed voltage, although a charge may build up due to static electricity or due to interaction with the plasma.

Figure 2A:
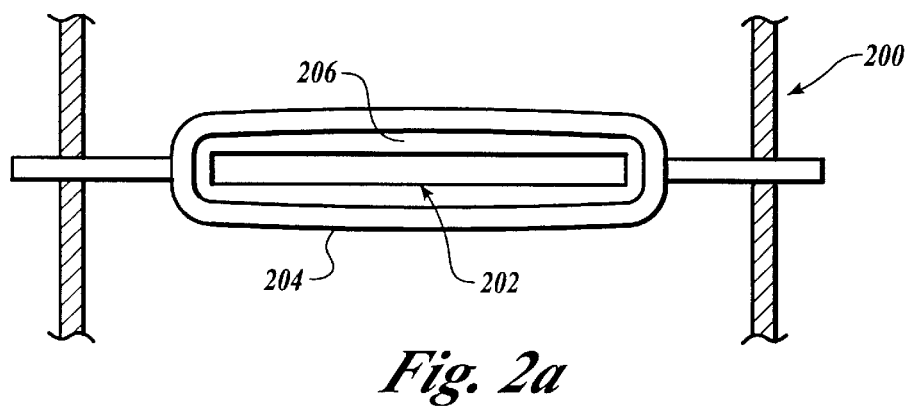
FIG. 2a is a cross section end view of the apparatus of FIG. 2.

A preferred shape of the glow discharge electrode 204, is shown in FIG. 2a. In this embodiment, the glow discharge electrode 204 is separate from the substrate 104 and is shaped so that evaporate flow from the evaporate inlet 202 substantially flows through an electrode opening 206. Any electrode shape can be used to create the glow discharge, however, the preferred shape of the electrode 204 does not shadow the plasma from the evaporate issuing from the outlet 202 and its symmetry, relative to the polymer precursor exit slit 202 and substrate 104, provides uniformity of the evaporate vapor flow to the plasma across the width of the substrate while uniformity transverse to the width follows from the substrate motion.

The spacing of the electrode 204 from the substrate 104 is a gap or distance that permits the plasma to impinge upon the substrate. This distance that the plasma extends from the electrode will depend on the evaporate species, electrode 204/substrate 104 geometry, electrical voltage and frequency, and pressure in the standard way as described in detail in ELECTRICAL DISCHARGES IN GASSES, F. M. Penning, Gordon and Breach Science Publishers, 1965, and summarized in THIN FILM PROCESSES, J. L. Vossen, W. Kern, editors, Academic Press, 1978, Part II, Chapter II-1, Glow Discharge Sputter Deposition, both hereby incorporated by reference.

Figure 3:
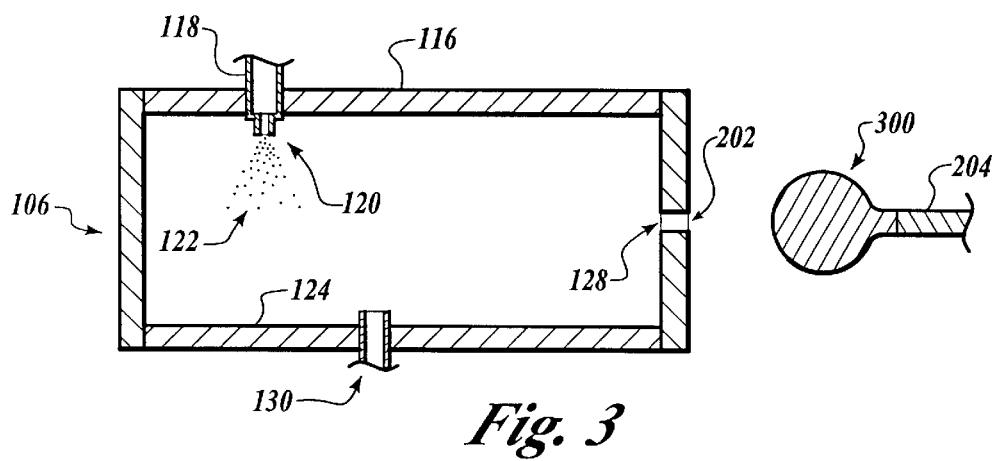
FIG. 3 is a cross section of an apparatus in which the substrate is the electrode.

An apparatus suitable for batch operation is shown in FIG. 3. In this embodiment, the glow discharge electrode 204 is sufficiently proximate a part 300 (substrate) that the part 300 is an extension of or part of the electrode 204. Moreover, the part is below a dew point to allow cryocondensation of the glow discharge plasma on the part 300 and thereby coat the part 300 with the polymer precursor condensate and self cure into a polymer layer. Sufficiently proximate may be connected to, resting upon, in direct contact with, or separated by a gap or distance that permits the plasma to impinge upon the substrate. This distance that the plasma extends from the electrode will depend on the evaporate species, electrode 204/part 300 geometry, electrical voltage and frequency, and pressure in the standard way as described in ELECTRICAL DISCHARGES IN GASSES, F. M. Penning, Gordon and Breach Science Publishers, 1965, hereby incorporated by reference. The part 300 may be stationary or moving during cryocondensation. Moving includes rotation and translation and may be employed for controlling the thickness and uniformity of the polymer precursor layer cryocondensed thereon. Because the cryocondensation occurs rapidly, within milli-seconds to seconds, the part may be removed after coating and before it exceeds a coating temperature limit.

In operation, either as a method for plasma enhanced chemical vapor deposition of low vapor pressure conjugated materials onto a substrate, or as a method for making self-curing conjugated polymer layers (especially PML), the method of the invention includes flash evaporating a conjugated material forming an evaporate, passing the evaporate to a glow discharge electrode creating a glow discharge conjugated material plasma from the evaporate, and cryocondensing the glow discharge conjugated polymer precursor plasma on a substrate as a condensate and crosslinking the condensate thereon, the crosslinking resulting from radicals created in the glow discharge plasma.

The flash evaporating may be performed by supplying a continuous liquid flow of the conjugated material into a vacuum environment at a temperature below both the decomposition temperature and the polymerization temperature of the conjugated material, continuously atomizing the conjugated material into a continuous flow of droplets, and continuously vaporizing the droplets by continuously contacting the droplets on a heated surface having a temperature at or above a boiling point of the conjugated material, but below a pyrolysis temperature, forming the evaporate. The droplets typically range in size from about 1 micrometer to about 50 micrometers, but they could be smaller or larger.

Alternatively, the flash evaporating may be performed by supplying a continuous liquid flow of the conjugated material into a vacuum environment at a temperature below both the decomposition temperature and the polymerization temperature of the conjugated material, and continuously directly vaporizing the liquid flow of the conjugated material by continuously contacting the conjugated material on a heated surface having a temperature at or above the boiling point of the conjugated material, but below the pyrolysis temperature, forming the evaporate. This may be done using the vaporizer disclosed in U.S. Pat. Nos. 5,402,314, 5,536, 323, and 5,711,816, which are incorporated herein by reference.

Figure 1A:
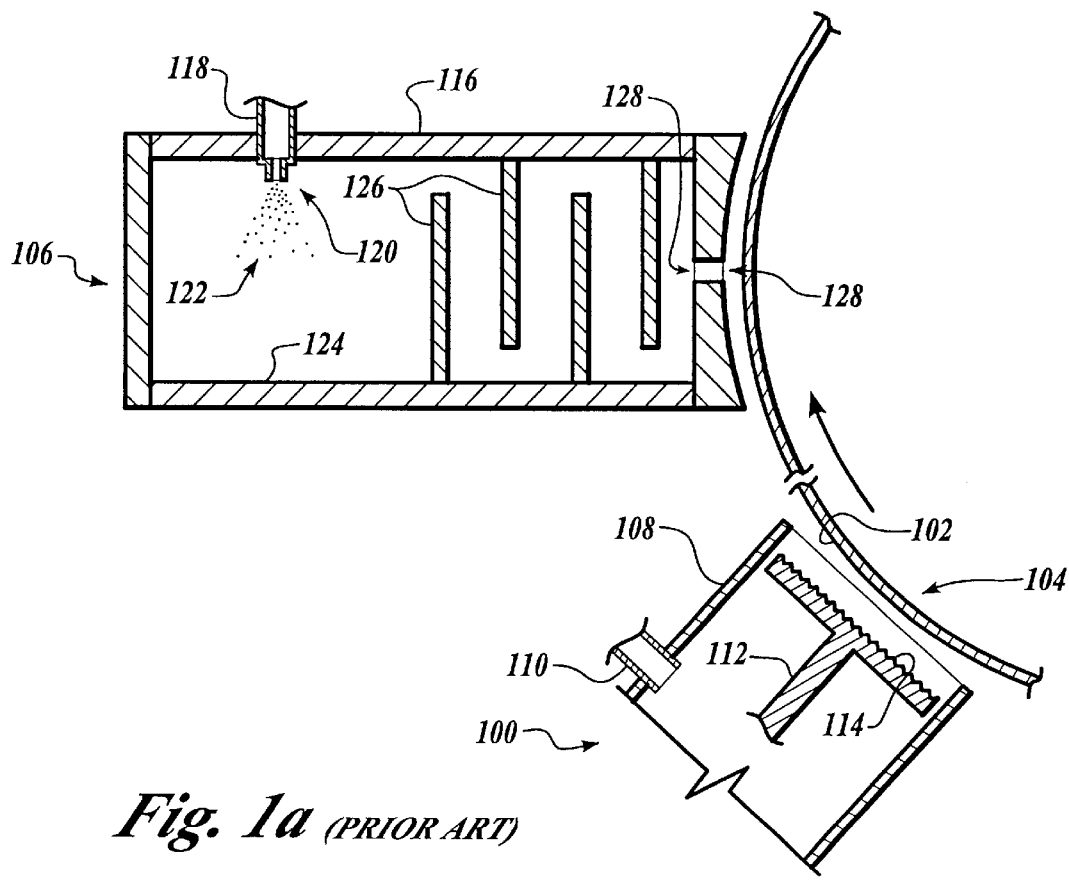
FIG. 1a is a cross section of a prior art combination of a glow discharge plasma generator with inorganic compounds with flash evaporation.
Figure 1B:
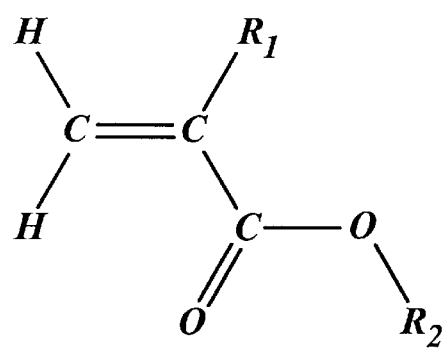
FIG. 1b is a chemical diagram of (meth)acrylate.
Figure 1C:
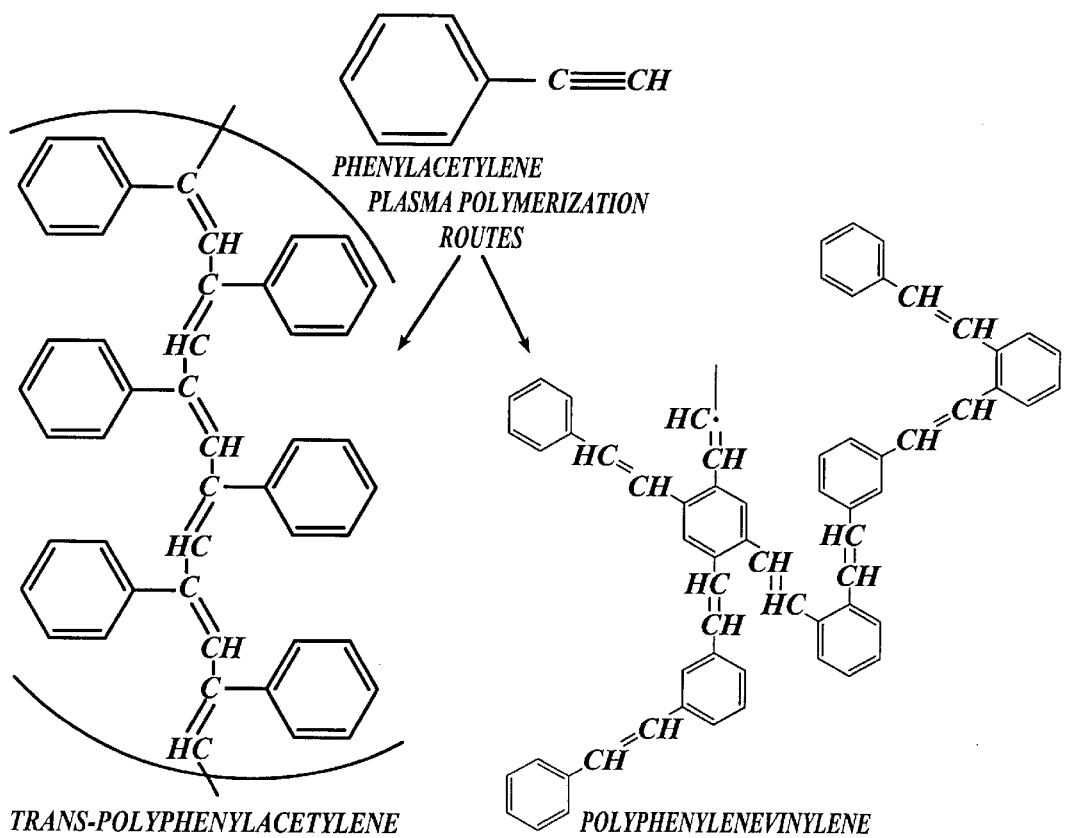
FIG. 1c is a chemical diagram of phenylacetylene and two plasma polymerization routes from phenylacetylene to conjugated polymer.

The conjugated material may be any liquid conjugated polymer precursor. However, it is preferred that the liquid conjugated polymer precursor have a low vapor pressure at ambient temperatures so that it will readily cryocondense. The vapor pressure of the liquid conjugated polymer precursor maybe less than about 10 torr at 83° F. (28.3° C.), less than about 1 torr at 83° F. (28.3° C.), and less than about 10 millitorr at 83° F. (28.3° C.). For conjugated polymer precursors of the same chemical family, conjugated polymer precursors with low vapor pressures usually also have higher molecular weight and are more readily cryocondensible than higher vapor pressure, lower molecular weight conjugated polymer precursors. Liquid conjugated polymer precursors include, but are not limited to, phenylacetylene (FIG. 1c).

Alternatively, the conjugated material may be an unconjugated polymer precursor containing conjugated particles or a conjugated polymer precursor with conjugated particles. Unconjugated polymer precursors include, but are not limited to, (meth)acrylate(s) and combinations thereof.

Figure 1D:
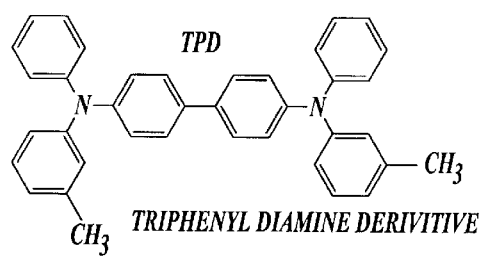
FIG. 1d is a chemical diagram of triphenyl diamine derivative.
Figure 1E:
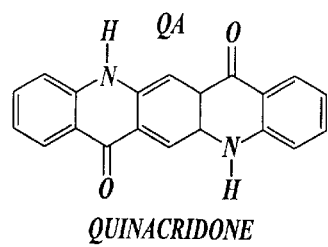
FIG. 1e is a chemical diagram of quinacridone.

The conjugated particle(s) may be any insoluble or partially insoluble conjugated particle type having a boiling point below a temperature of the heated surface in the flash evaporation process. Insoluble conjugated particles include, but are not limited to, phenyl acetylene, triphenyl diamine derivatives (TPD, FIG. 1d), quinacridone derivatives (QA, FIG. 1e), and combinations thereof. To achieve a conductive polymer, it is necessary to dope a conjugated polymer. Dopants include, but are not limited to, salts such as lithium-trifluoromethanesulfonate ($CF_3SO_3Li$), other salts of lithium, salts of iodine, iodine, and combinations thereof.

The insoluble conjugated particles generally have a volume much less than about 5000 cubic micrometers (diameter about 21 micrometers) or equal thereto, typically less than or equal to about 4 cubic micrometers (diameter about 2 micrometers). The insoluble conjugated particles may be sufficiently small with respect to particle density and liquid polymer precursor density and viscosity that the settling rate of the conjugated particles within the liquid polymer precursor is several times greater than the amount of time to transport a portion of the liquid polymer precursor mixture from a reservoir to the atomization nozzle. It may be necessary to agitate the conjugated particle liquid polymer precursor mixture in the reservoir to maintain suspension of the conjugated particles and avoid settling. As used herein, agitation includes, but is not limited to, stirring, physical shaking, ultrasonic vibration, and convection (thermal gradient).

The mixture of polymer precursor and insoluble or partially soluble conjugated particles may be considered a slurry, suspension or emulsion, and the conjugated particles may be solid or liquid. The mixture may be obtained by several methods. One method is to mix insoluble conjugated particles of a specified size into the polymer precursor. The insoluble conjugated particles of a solid of a specified size may be obtained by direct purchase or by making them by one of any standard techniques, including, but not limited to, milling from large conjugated particles, precipitation from solution, melting/spraying under controlled atmospheres, rapid thermal decomposition of precursors from solution as described in U.S. Pat. No. 5,652,192 hereby incorporated by reference. The steps of U.S. Pat. No. 5,652,192 are making a solution of a soluble precursor in a solvent and flowing the solution through a reaction vessel, pressurizing and heating the flowing solution and forming substantially insoluble conjugated particles, then quenching the heated flowing solution and arresting growth of the conjugated particles. Alternatively, larger sizes of solid conjugated material may be mixed into liquid polymer precursor then agitated, for example ultrasonically, to break the solid conjugated material into conjugated particles of sufficient size.

Liquid conjugated particles may be obtained by mixing an immiscible conjugated liquid with the polymer precursor liquid and agitating by ultrasonic or mechanical mixing to produce liquid conjugated particles within the liquid polymer precursor. Immiscible conjugated liquids include, for example, phenylacetylene.

If an atomizer is used, upon spraying, the droplets may be conjugated particles alone, conjugated particles surrounded by liquid polymer precursor, and liquid polymer precursor alone. Since both the liquid polymer precursor and the conjugated particles are evaporated, it is of no consequence either way. The droplets should be sufficiently small that they are completely vaporized. The droplet size typically range from about 1 micrometer to about 50 micrometers, although they may be larger or smaller.

By using flash evaporation, the conjugated material is vaporized so quickly that reactions that generally occur from heating a liquid conjugated material to an evaporation temperature simply do not occur. Further, control of the rate of evaporate delivery is strictly controlled by the rate of conjugated material delivery to the inlet 118 of the Hash evaporator 106.

In addition to the evaporate from the conjugated material, additional gases may be added within the flash evaporator 106 through a gas inlet 130 upstream of the evaporate outlet 128, preferably between the heated surface 124 and the first baffle 126 nearest the heated surface 124. Additional gases may be organic or inorganic for purposes including, but not limited to, ballast reaction, and combinations thereof. Ballast refers to providing sufficient molecules to keep the plasma lit in circumstances of low evaporate flow rate. Reaction refers to chemical reaction to form a compound different from the evaporate. Additional gases include, but are not limited to, group VIII of the periodic table, hydrogen, oxygen, nitrogen, chlorine, bromine, polyatomic gases including for example carbon dioxide, carbon monoxide, water vapor, and combinations thereof.

The conjugated polymer is conductive when doped with a dopant, for example, a salt of iodine, lithium, or a combination thereof. The dopant is preferably introduced into the conjugated polymer precursor and carried over with the conjugated polymer precursor during flash evaporation.

The method of the present invention may obtain a polymer layer either by curing, including, but not limited to, radiation curing, including ultraviolet, electron beam or x-ray, glow discharge ionization, and spontaneous thermal induced curing. In radiation curing (FIG. 1), the polymer precursor liquid may include a photoinitiator. In glow discharge ionization, a combined flash evaporator, glow discharge plasma generator is used without either the electron beam gun or ultraviolet light.

The present invention is insensitive to a direction of motion of the substrate because the deposited conjugated polymer precursor layer is self-curing. Also, the conjugation is preserved during curing. In the prior art, the deposited polymer precursor layer required a radiation curing apparatus so that the motion of the substrate had to be from the place of deposition toward the radiation apparatus and which interfered with conjugation as previously discussed.

In addition, multiple layers of materials may be combined. For example, as recited in U.S. Pat. Nos. 5,547,508 and 5,395,644, 5,260,095, hereby incorporated by reference, multiple polymer layers, alternating layers of polymer and metal, and other layers may be made with the present invention in the vacuum environment.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of making a conjugated polymer layer with plasma enhanced chemical vapor deposition of a conjugated material onto a substrate in a vacuum environment, comprising:

(a) making an evaporate by receiving the conjugated material into a flash evaporation housing, evaporating the conjugated material on an evaporation surface, and discharging the evaporate of the conjugated material through an evaporate outlet;

(b) making a conjugated material plasma from the evaporate by passing the evaporate proximate a glow discharge electrode; and (c) cryocondensing the conjugated material plasma onto the substrate as a condensate, wherein the conjugated material is selected from an unconjugated polymer precursor with conjugated particles, or a conjugated polymer precursor with conjugated particles, and wherein the conjugated particles are selected from phenylacetylene, triphenyl diamine derivatives, quinacridone derivatives, and combinations thereof.

2. The method as recited in claim 1, wherein the substrate is proximate the glow discharge electrode, and is electrically biased with an impressed voltage.

3. The method as recited in claim 1, wherein the glow discharge electrode is positioned within a glow discharge housing having an evaporate inlet proximate the evaporate outlet, the glow discharge housing and the glow discharge electrode maintained at a temperature above a dew point of the evaporate, and the substrate is downstream of the conjugated material plasma and is electrically floating.

4. The method as recited in claim 1, wherein the substrate is proximate the glow discharge electrode and is electrically grounded.

5. The method as recited in claim 1, wherein the substrate is cooled.

6. The method as recited in claim 1, further comprising adding an additional gas to the evaporate.

7. The method as recited in claim 6, wherein the additional gas is a ballast gas.

8. The method as recited in claim 6, wherein the additional gas is a reaction gas.

9. The method as recited in claim 1, further comprising adding a dopant to the conjugated material.

10. The method as recited in claim 9, wherein the dopant is selected from the group consisting of iodine, salts of iodine, and salts of lithium, and combinations thereof.

11. The method as recited in claim 1, wherein the conjugated particles are selected from the group consisting of organic solids, liquids, and combinations thereof.

12. The method of claim 1 wherein the conjugated material is the unconjugated polymer precursor with conjugated particles.

13. The method of claim 12 wherein the unconjugated polymer precursor is selected from (meth)acrylate polymer precursors.

14. The method of claim 1 wherein the conjugated material is the conjugated polymer precursor with conjugated particles.

15. A method for making conjugated polymer layers in a vacuum chamber, comprising:
(a) flash evaporating a conjugated material forming an evaporate;
(b) passing the evaporate to a glow discharge electrode creating a glow discharge conjugated material plasma from the evaporate; and
(c) condensing the glow discharge conjugated material plasma on a substrate as a condensate and crosslinking the condensate thereon, the crosslinking resulting from radicals created in the glow discharge material plasma, wherein the conjugated material is selected from an unconjugated polymer precursor with conjugated particles or a conjugated polymer precursor with conjugated particles, and wherein the conjugated particles are selected from phenylacetylene, triphenyldiamine derivatives, quinacridone derivatives, and combinations thereof.

16. The method as recited in claim 15, wherein the substrate is proximate the glow discharge electrode and is electrically biased with an impressed voltage.

17. The method as recited in claim 15, wherein the glow discharge electrode is positioned within a glow discharge housing having an evaporate inlet proximate the evaporate outlet, the glow discharge housing and the glow discharge electrode maintained at a temperature above a dew point of the evaporate, and the substrate is downstream of the glow discharge conjugated material plasma, and is electrically floating.

18. The method as recited in claim 15, wherein the substrate is proximate the glow discharge electrode and is electrically grounded.

19. The method as recited in claim 15, wherein the conjugated material is the conjugated polymer precursor containing conjugated particles.

20. The method as recited in claim 15, wherein the substrate is cooled.

21. The method as recited in claim 15, further comprising adding a dopant to the conjugated material.

22. The method as recited in claim 21, wherein the dopant is selected from the group consisting of iodine, salts of iodine, and salts of lithium, and combinations thereof.

23. The method as recited in claim 15, wherein the conjugated material is the unconjugated polymer precursor containing conjugated particles.

24. The method of claim 23 wherein the unconjugated polymer precursor is selected from (meth)acrylates.

25. The method as recited in claim 15, wherein the conjugated particles are selected from the group consisting of organic solids, liquids, and combinations thereof.

26. The method as recited in claim 15, wherein flash evaporating comprises:
(a) supplying a continuous liquid flow of the conjugated material into a vacuum environment at a temperature below both the decomposition temperature and the polymerization temperature of the conjugated material;
(b) continuously atomizing the conjugated material into a continuous flow of droplets; and
(c) continuously vaporizing the droplets by continuously contacting the droplets on a heated surface having a temperature at or above a boiling point of the conjugated material, but below a pyrolysis temperature, forming the evaporate.

27. The method as recited in claim 26 wherein the droplets range in size from about 1 micrometer to about 50 micrometers.

28. The method as recited in claim 15, wherein flash evaporating comprises:
(a) supplying a continuous liquid flow of the conjugated material into a vacuum environment at a temperature below both the decomposition temperature and the polymerization temperature of the conjugated material; and
(b) continuously directly vaporizing the liquid flow of the conjugated material by continuously contacting the conjugated material on a heated surface having a temperature at or above a boiling point of the conjugated material, but below a pyrolysis temperature, forming the evaporate.

* * * * *

UNITED STATES PATENT AND TRADEMARK OFFICE
CERTIFICATE OF CORRECTION

PATENT NO. : 6,544,600 B2
DATED : April 8, 2003
INVENTOR(S) : John D. Affinito et al.

It is certified that error appears in the above-identified patent and that said Letters Patent is hereby corrected as shown below:

Column 4,
Line 41, "permitting case of scaling" should be -- permitting ease of scaling -- and Column 7,
Line 43, "the Hash evaporator 106." should be -- the flash evaporator 106. --.

Signed and Sealed this

Tenth Day of June, 2003

JAMES E. ROGAN
*Director of the United States Patent and Trademark Office*